United States Patent
Mackiewicz et al.

(10) Patent No.: US 6,920,964 B1
(45) Date of Patent: Jul. 26, 2005

(54) AUTOMATED HYDRAULIC BRAKE

(75) Inventors: John Edmund Mackiewicz, Niles, MI (US); Roger William Oltmanns, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 80 days.

(21) Appl. No.: 10/707,429

(22) Filed: Dec. 12, 2003

(51) Int. Cl.$^7$ .............................................. F16D 55/18
(52) U.S. Cl. .................... 188/72.4; 188/72.6; 188/262; 188/353; 303/89
(58) Field of Search .............................. 188/72.7, 71.7, 188/74, 343, 151 R, 216, 265, 170, 370, 188/72.4, 72.6–72.8, 106 P, 353; 303/89, 303/71, 13–15; 92/24–27, 21 MR, 63

(56) References Cited

U.S. PATENT DOCUMENTS

| | | | | |
|---|---|---|---|---|
| 3,547,233 A | * | 12/1970 | Girvan ........................ | 188/170 |
| 3,599,761 A | * | 8/1971 | Schultz et al. .............. | 188/170 |
| 3,730,303 A | * | 5/1973 | Bricker et al. .............. | 188/170 |
| 3,750,853 A | * | 8/1973 | Farr ........................ | 188/196 R |
| 3,908,804 A | * | 9/1975 | Cochran ..................... | 188/170 |
| 4,116,307 A | * | 9/1978 | Reinecke ................. | 188/106 P |
| 4,412,603 A | * | 11/1983 | Bischoff .................. | 188/106 P |
| 5,161,650 A | | 11/1992 | Taig | |
| 5,176,227 A | * | 1/1993 | Kohler ........................ | 188/59 |
| 5,219,047 A | | 6/1993 | Fouilleux et al. | |
| 5,370,449 A | | 12/1994 | Edelen et al. | |
| 5,954,162 A | * | 9/1999 | Feigel et al. ............... | 188/72.6 |
| 6,311,808 B1 | | 11/2001 | Halasy-Wimmer et al. | |
| 6,598,943 B2 | | 7/2003 | Harris | |

* cited by examiner

*Primary Examiner*—Douglas C. Butler
(74) *Attorney, Agent, or Firm*—Leo H McCormick, Jr.; Warren Comstock

(57) ABSTRACT

A brake actuating assembly includes a cam member that has first and second cam surfaces. A first piston in a first hydraulic circuit is selectively enabled to axially translate the cam member from a released position to an actuation position while an actuation piston moves friction surfaces into engagement with a rotor to effect a brake application. During a brake application, pressurized fluid is diverted away from a second piston in a second hydraulic circuit that is later enabled to return the cam member to the released position. A resilient assembly selectively engages the second cam surface to obliquely move the cam member toward the actuation piston during a brake application. An electrically actuable valve supplies pressure fluid that acts on and moves the resilient assembly away from the second cam surface and thereafter allow a second hydraulic piston to return cam member to the released position.

13 Claims, 3 Drawing Sheets understand# AUTOMATED HYDRAULIC BRAKE

BACKGROUND OF INVENTION

1. Field of the Invention

The present invention relates to a parking brake for a hydraulic braking systems wherein service brakes are hydraulically applied to effect a brake application in the wheel brakes and resiliently retained in an applied condition without hydraulic pressure until released by a reapplication of hydraulic pressure.

2. Description of the Related Art

It is known to control the brake function of a parking brake through a cable control of a cam or lever to mechanically apply and release a service brake. In addition, electrical control of parking brake systems could also be achieved by a spring apply and a hydraulic or air release using a two-position switch to supply current to activate a solenoid actuated valve. The parking brake being applied by a spring that acts through a linkage to provide a mechanical force that moves friction linings into engagement with a drum or disc brake to effect a parking brake application such as disclosed in shown in U.S. Pat. No. 5,370,449. A solenoid latching mechanism for a parking brake is shown in U.S. Pat. No. 5,443,132 and a hydraulically applied and released parking brake mechanism has been suggested in U.S. Pat. No. 5,161,650. This patented arrangement provides rigid coupling forcing brake friction surfaces into engagement. In addition, it is known to provide for a hydraulic apply, but a spring-loaded release of a parking brake mechanism. Unfortunately in such a spring loaded release design it could be susceptible to an unintended release in cases where the clamp load of the brake caliper might be reduced and as a result the cam could move to the released position under the force of the release spring. This would cause the parking brake to release unintentionally.

It is desirable to provide a certain amount of compliance or resilience to a parking brake assembly to avoid brake release or undue strain on the braking system due to dimensional variations in the brake mechanism as might, for example, be caused by temperature induced expansion or contraction of brake mechanism components.

SUMMARY OF INVENTION

The present invention provides solutions to the above problems by providing a resilient or compliant biasing force for maintaining vehicle brake friction surfaces engaged to provide a parking brake function.

The present invention improves upon previous designs in several ways including structure for a hydraulic apply and a hydraulic release while maintaining the apply function in a mechanically compliant fashion to prevents a possibility of an inadvertent release. The structure provides two distinct and positively held positions (applied and unapplied) that do not change during a variance in clamp load. The addition of parking brake compliance will prevent roll-away, reduce system clamping pressure, and provide a corresponding reduction of caliper stresses, while importantly not adding to caliper compliance during service brake applies which would increase pedal travel and degrade pedal feel.

The invention comprises, in one form thereof, a vehicle parking brake actuating assembly with a first hydraulic circuit for initially applying the vehicle parking brake and a second hydraulic circuit for returning the vehicle parking brake to an unapplied state. Once applied, a resilient bias assembly retains the vehicle parking brake in the applied state until the second hydraulic circuit is enabled.

In more particular detail, a vehicle parking brake actuating assembly has a hydraulic circuit that may be selectively enabled to initially apply the vehicle parking brake, a resilient bias assembly for retaining the vehicle parking brake in the applied state, and another hydraulic circuit that may be selectively enabled to return the vehicle parking brake to an unapplied state. The resilient bias assembly may include a brake piston for actuating the brake, a Belleville piston, a Belleville spring engaging the Belleville piston to move the Belleville piston toward the brake piston, a cam member disposed intermediate the Belleville piston and brake piston, and an arrangement including the hydraulic circuits for reciprocally shuttling the cam member between a brake applied position where the cam member transfers a biasing force from the Belleville spring the brake piston, and a brake unapplied position where application of Belleville spring force to the brake piston is precluded by the cam member. The hydraulic circuits may each include a hydraulic piston engaging a corresponding end of the cam member and responsive to applied hydraulic pressure to translate the cam member. The hydraulic circuits may each further include a displacement piston resiliently biased to displace fluid away from the corresponding hydraulic piston subsequent to enablement of the corresponding hydraulic circuit.

An advantage of the present invention resided in structure wherein brake caliper overstress is limited and yet inadvertent parking brake release is prevented to avoid vehicle roll after a parking brake has been applied.

BRIEF DESCRIPTION OF DRAWINGS

Corresponding reference characters indicate corresponding parts throughout the several drawing views.

DETAILED DESCRIPTION

Figure 1:
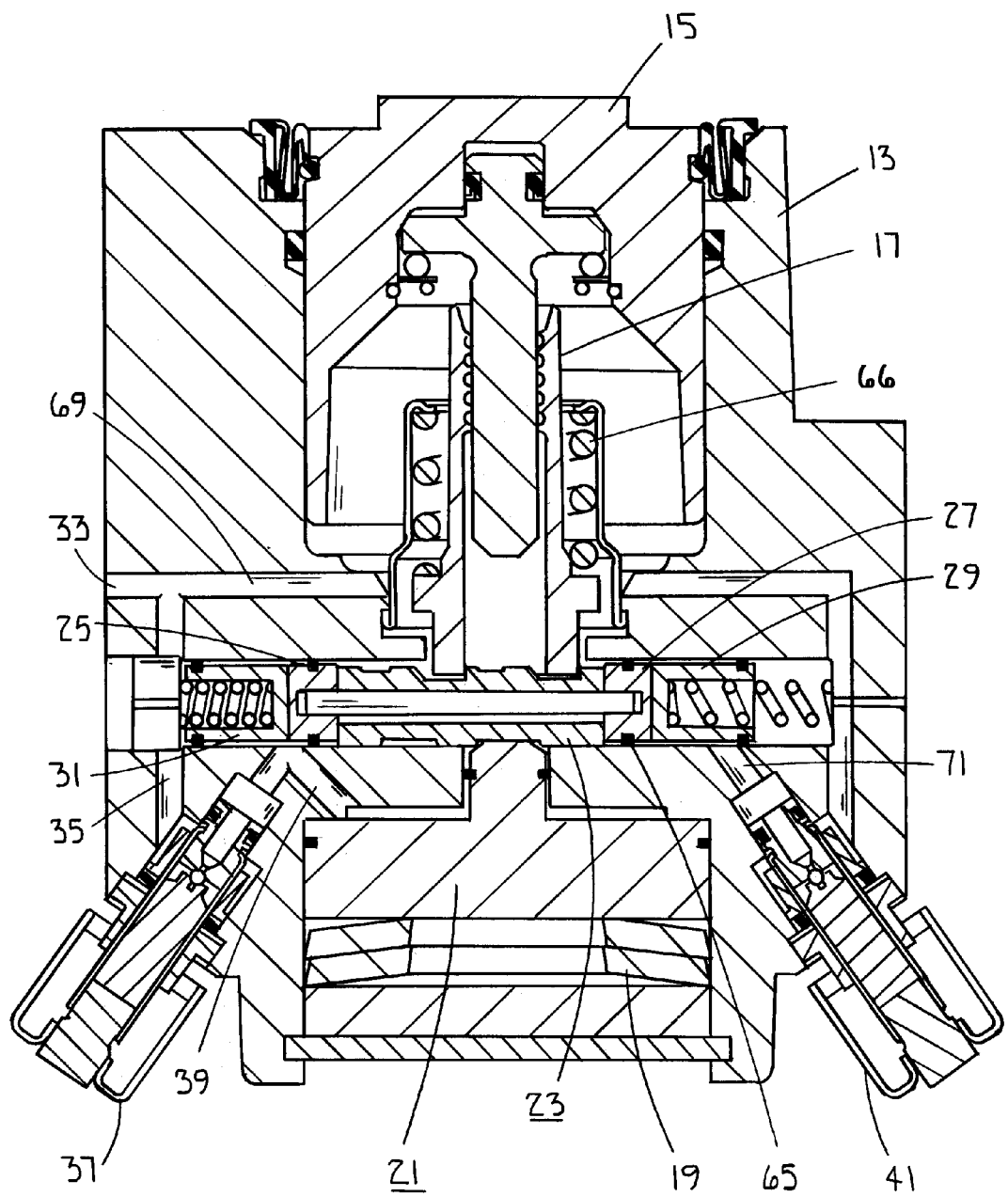
FIG. 1 is a cross-sectional view of the brake actuating assembly according to the invention in one form in a brake released configuration.

Referring now to the drawings and particularly to FIG. 1, there is shown an illustrative portion of a disk brake caliper assembly 11 including a caliper assembly housing 13 containing a service brake piston 15 which is movable upwardly upon command from the brake released position shown to retain a rotatable brake disk between first and second friction pads in a manner known in the prior art. A parking brake adjuster assembly 17 engages the service brake piston 15 near one end (upper as shown) and selectively engages a shuttle or cam member 23 near the other end. The cam member 23 is also selectively engaged from below by one end of a Belleville piston 21 that is moved into engagement with the cam member 23 by a Belleville spring or washer stack 19. The opposed ends of the cam member 23 are engaged by an apply piston 25 and a release piston 27 respectively and outboard of the apply and release pistons are located a pair of spring biased displacement pistons 29 and 31. Appropriate seals such as 45, 66 and 67 may be provided. An apply solenoid valve 37 provides, upon energization, a path for pressure fluid from fluid channel 33 by way of conduit 35 to move the apply piston 25 and the cam member 23 rightwardly as shown. When energized, the apply solenoid valve 37 also provides fluid flow through a fluid passageway 39 to force and move Belleville piston 21 downwardly out of engagement with cam notch 47 and compressing Belleville spring 19. Similarly, a release solenoid valve 41 may be energized to provide a pressure fluid path from the fluid channel 33 by way of conduits 69 and 71 to move the release piston 27 toward the left as viewed.

Figure 2A:
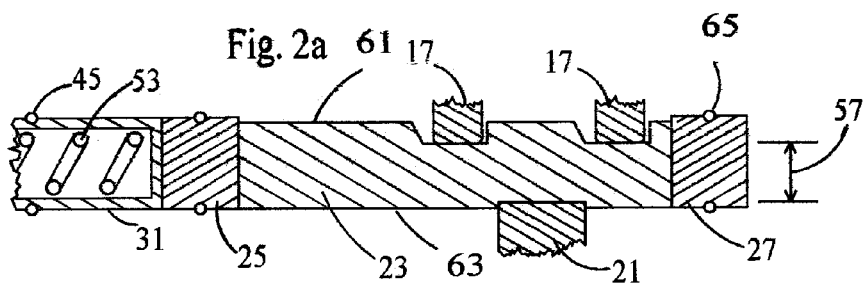
FIGS. 2a–2e are cross-sectional views of the cam and adjoining parts of FIG. 1 illustrating brake operation.
Figure 2B:
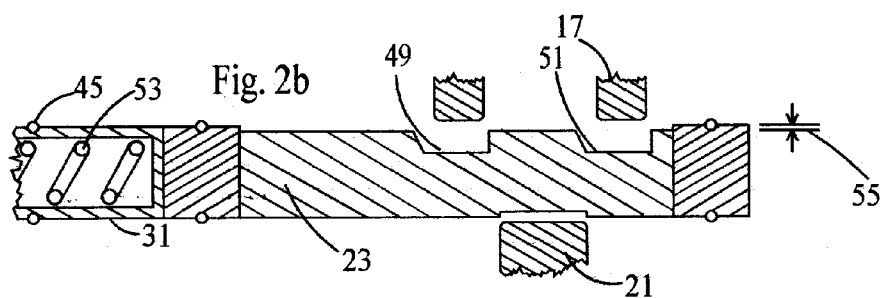
Figure 2C:
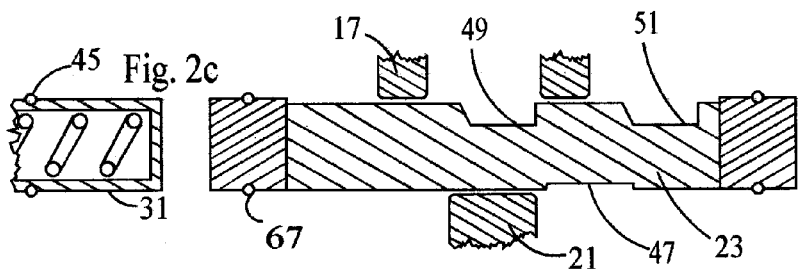
Figure 2D:
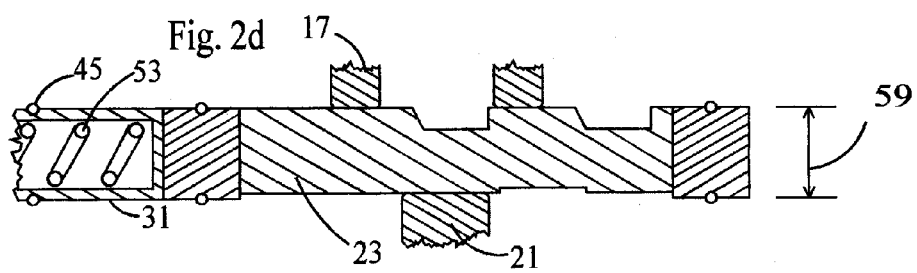
Figure 2E:
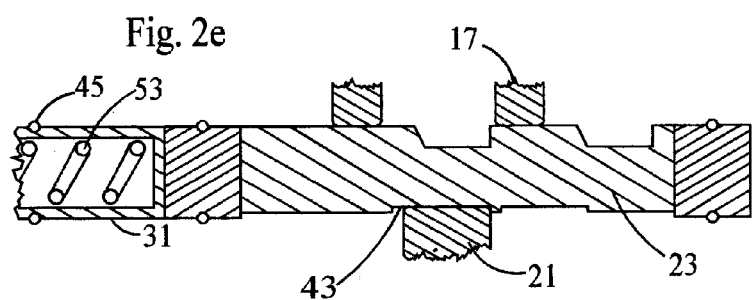
Figure 3:
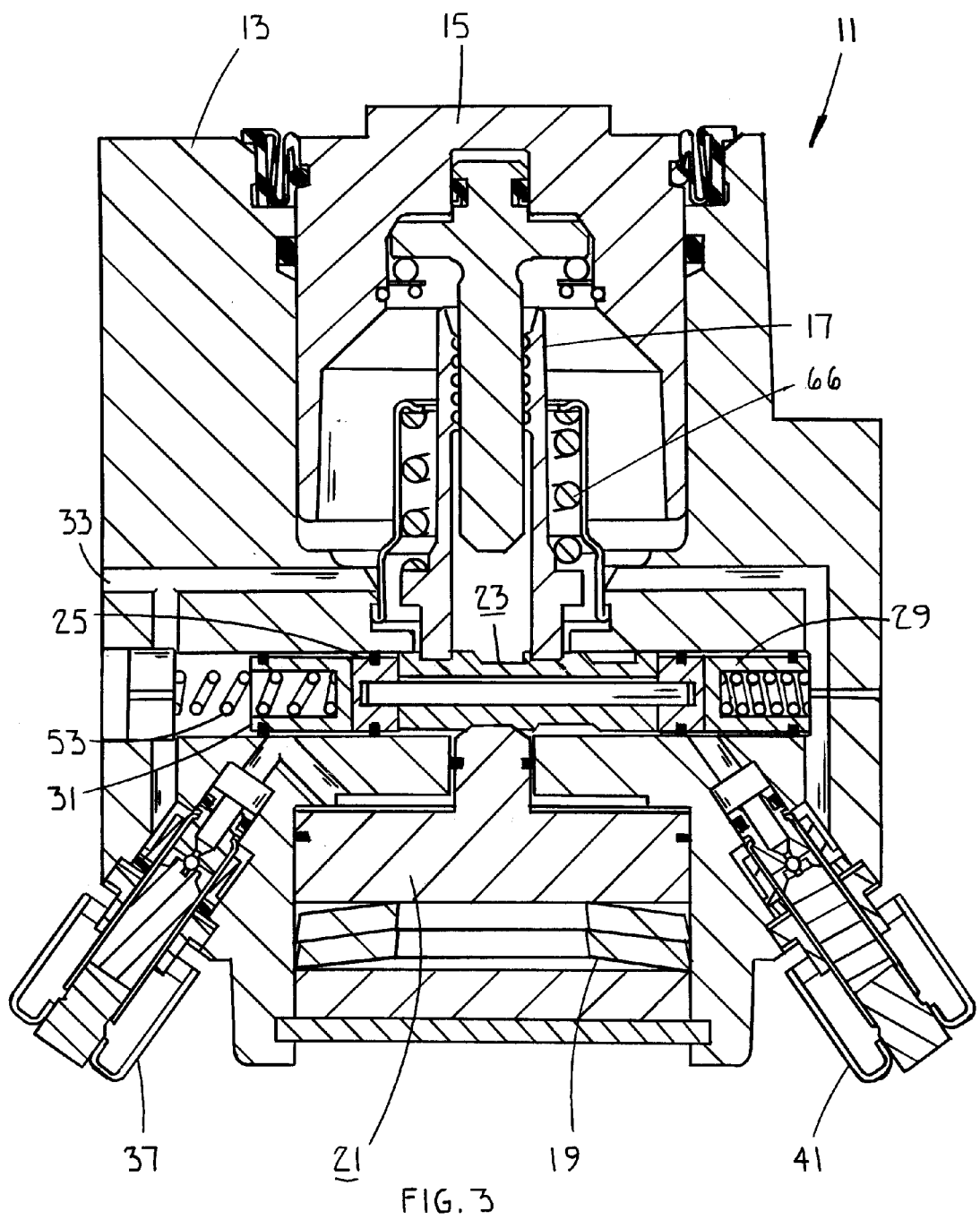
FIG. 3 is a cross-sectional view of the brake actuating assembly of FIG. 1, but in a brake applied configuration.

In the caliper brake assembly 11 cross-sectional view shown in FIG. 1, the service and parking brake is shown in the unapplied or released state. Service brake applies are accomplished when fluid under pressure as commanded by the driver from the actuation system enters the fluid channel 33 and, by way of conduit 69, causes the service brake piston 15 and parking brake adjuster assembly 17 to move outboard (upward as oriented in FIG. 1) and thus apply the service brake. The parking brake is applied when fluid under pressure enters the designated fluid channel 33 and, as in the service brake application, acts upon the service brake piston 15 and parking brake adjuster assembly 17, causing it to move outboard (upwardly) to affect a brake apply. This motion disengages the lower legs of adjuster assembly 17 from a pair of cam member 23 notches 49 and 51. Fluid is then simultaneously or subsequently supplied to the apply piston 25 and Belleville piston 21 via the apply solenoid valve 37 that allows communication of the service brake circuit fluid pressure to the apply piston 25 by way of conduit 35. This apply of the cam member 23, via the hydraulic apply piston 25, has been facilitated by the simultaneous or previous action of the service brake piston 15 to move the service brake piston and parking brake adjuster assembly 17 away from and out of the way of the apply path of the cam. The fluid pressure applied to the Belleville piston 21 by way of conduit 39 has also moved the Belleville piston 21 away from the cam and out of engagement with cam notch 47 while compressing the stack of Belleville washers 19. Freeing the cam member 23 for axial translation is seen by comparing FIGS. 2a and 2b. Axial movement of the cam member 23 is seen by comparing FIGS. 2b and 2c. Room for the cam member 23 to move to the applied position of FIGS. 2d, 2e and 3 is provided by the movement of a displacement piston 29. These displacement pistons 29 and 31 are disposed on each end of the cam member 23 outboard of the pistons 25 and 27 to ensure a reserved volume into which the cam can move when applied or released. The springs such as 53 on the backside of the displacement pistons are used to displace any fluid back to the actuation system when an apply or release has been accomplished and the system returns to a non-pressurized state. These displacement pistons are a place/volume keeper for the fluid that normally would be pushed back to a system reservoir during an apply or release. However, since only one fluid channel is connected between the brake and the actuation system, it is desirable to store this fluid during pressurization of the fluid channel, until such time that system pressure is returned to zero and then the spring loaded displacement piston can push this fluid back into the actuation system. Once the cam member 23 has moved into the apply position of FIG. 3, the service brake circuit fluid pressure throughout the entire brake, can then be reduced to zero. This will allow the service brake piston 15 and adjuster assembly 17 to relax back against the cam and correspondingly for the Belleville piston 21 to be pushed against the cam by the force of the Belleville washers. It also allows spring 53 to force displacement piston 31 to return fluid to the supply by way of channel 33, all as illustrated by comparing FIGS. 2c and 2d. In this apply position, the cam member 23 has a larger cross-section presented in between the service brake piston and adjuster assembly, and the Belleville piston 21 shown at 59 in FIG. 2d than it did in the released position shown at 57 in FIG. 2a. This causes the compressive load of the Belleville washer stack 19 to act directly against the service brake piston 15 and adjuster assembly 17 through the larger cross-section 59 of the cam. The cam is configured such that it can move freely transversely to its direction of reciprocation (up and down as viewed) by a distance illustrated at 55 in FIG. 2b in the cam bore to allow the compressive force of the Belleville washer stack to act directly against the service brake piston and adjuster assembly. The cam member 23 is shown in the parking brake released position in FIGS. 2a–2b, while FIGS. 2d and 2e show the parking brake applied position. The service brake caliper acting as the brake component of the parking brake, is then held in the apply position by the cam and Belleville piston. The engagement of the Belleville piston into optional additional indents in the cam as shown at 43 in FIG. 2e will enhance the prevention of longitudinal movement of the cam and thus prevent an unintended parking brake release.

This interaction between the Belleville washer stack 19, and the service brake piston 15 and adjuster assembly 17 adds compliance to the parking brake components. This ensures that in cases, such as thermal contraction of the friction material, the resulting lost travel can be compensated by the movement of the Belleville washer stack to maintain a very consistent parking brake caliper clamp load on the shoe and lining assemblies to maintain the required level of torque. This added compliance is only present within the caliper during the parking brake application and therefore does not effect the compliance or pedal feel of the service brake system. Belleville washers are preferred for their size to force efficiency and for their ability under load to demonstrate a low spring rate. This low spring rate provides for a reduced fall-off in a brake clamp load and brake torque in cases such as thermal contraction of the friction material.

Release of the parking brake is accomplished when fluid under pressure enters the designated fluid channel 33 and, as in the service brake application, acts upon the service brake piston 15 and parking brake adjuster assembly 17 to move it outboard (upwardly as shown). This allows the Belleville piston 21 to move upward until it reaches its physical stop in the housing 13. However, the gap created by the apply of the service brake piston and parking brake adjuster assembly is sufficient to allow longitudinal movement of the cam member 23 when fluid under pressure from the service brake circuit is communicated through conduit 69 to the release piston 27 via energization of the release solenoid valve 41. This movement results in the cam member 23 shuttling back to the released position of FIGS. 1, 2a and 2b. The attendant reduction in cross-section from 59 to 57 also acts to prevent longitudinal movement of the cam and would prevent the latching/reinforcing of an unintended parking brake apply. The pressure to the service brake piston and parking brake adjuster assembly is then released and the total release of the brake is accomplished as the released position of the cam presents a smaller cross-section 57 to the service brake piston and parking brake adjuster assembly, allowing it to fully retract to its released position. If the Belleville washer stack or spring 19, or other resilient component, were not present in the design, then the alternative for compensating for brake lining relaxation would be to use the existing caliper bridge compliance. This would necessitate pressurizing the caliper to a much higher pressure to additionally stretch the caliper to provide for the lost travel capability. This would require an inordinately high pressure and provide excessive stress to the caliper. The incorporation of the Belleville stack into the design precludes these problems.

In summary, a wheeled vehicle parking brake is applied and released by first hydraulically forcing the vehicle service brake piston 15 into a vehicle wheel rotation braking condition by supplying pressure fluid by way of fluid channel 33, and conduit 69 forcing the piston and adjuster assembly upwardly as viewed. A supplemental resilient bias is then applied to retain the vehicle service brake in the wheel rotation braking condition by initially temporarily applying hydraulic pressure by way of channel 33, conduit 35, the enabled valve 37 and conduit 39 to force Belleville piston 21 downwardly as viewed thereby temporarily overpowering the resilient bias as shown in FIG. 2b. Cam member 23 along with apply piston 25, release piston 27 and displacement piston 29 are then translated along a path generally oblique to the direction in which the resilient bias is applied as illustrated in the transition from FIG. 2b to FIG. 2c. The hydraulic force is then relieved while the supplemental resilient bias of spring 19 remains allowing Belleville piston 21 to move upwardly into engagement with cam surface 63. Cam member 23 is displaced by Belleville piston 21 in the direction in which the resilient bias is applied as illustrated by the transition from FIG. 2c to FIG. 2d. Here, the adjuster assembly 17 is moved into engagement with cam surface 61 by spring 65 and brake piston 15 from above and by spring 19 and Belleville piston 21 from below. Removal of the hydraulic pressure also allows displacement piston 31 to settle back against piston 25 providing space for a subsequent return of the cam and piston. In FIG. 2d, the effective length of the mechanical coupling between spring 19 and vehicle service brake applying piston 15 has varied from height 57 shown in FIG. 2a to height 59 to allow spring 19 to sustain a desired parking brake condition in the service brake.

Release of the parking brake essentially reverses these steps, but the displacement piston 31 remains in contact with piston 25 while displacement piston 29 temporarily separates from piston 27. The hydraulic force which hydraulically moves the vehicle service brake toward the vehicle wheel rotation braking condition is re-established, the supplemental resilient bias removed by translation of cam member 23 to the left as viewed, and the hydraulic force relieved thereby establishing a parking brake released condition in the service brake.

We claim:

1. A brake actuating assembly for a wheeled vehicle, comprising:
    a hydraulically actuable brake piston for moving friction braking surfaces into a braking mode of operation to arrest wheel rotation;
    an axially reciprocal cam member having a first cam surface and a second cam surface;
    a first hydraulic circuit for supplying hydraulic fluid to axially translate said cam member from a brake released position to a first position during said braking mode of operation;
    second hydraulic circuit for supplying hydraulic fluid to axially translate said cam member from said first position to said brake released position on termination of said braking mode of operation;
    a resilient assembly for selectively engaging the second cam surface to obliquely move said cam member from a position of rest to an operational position in a first direction toward said brake piston during a parking brake mode of operation and temporally being compressed in an opposite second direction to allow said cam member to return to said brake released position; and
    wherein the first and second hydraulic circuits each include a hydraulic piston that engage a corresponding end of said cam member and respond to applied hydraulic pressure to translate said cam member; and
    wherein the first and second hydraulic circuits each further include a displacement piston that is resiliently biased to displace fluid away from a corresponding hydraulic piston subsequent to enablement of the corresponding hydraulic circuit.

2. The brake actuating assembly of claim 1, wherein the first hydraulic circuit includes means for moving the hydraulically actuable brake piston toward the braking condition while translating the cam member.

3. The brake actuating assembly of claim 1 wherein the first hydraulic circuit further includes means for overpowering the resilient assembly while translating the cam member.

4. The brake actuating assembly of claim 1, wherein the second hydraulic circuit includes means for moving the hydraulically actuable brake piston toward a brake mode of operation while translating the cam member.

5. The brake actuating assembly of claim 1, wherein the first hydraulic circuit further includes a source of pressure fluid and an electrically actuable valve for selectively supplying pressure fluid from the source to the resilient assembly to move the resilient assembly away from the cam member, and for selectively supplying pressure fluid from the source to a first hydraulic piston of said hydraulic pistons forcing said first hydraulic piston to translate the cam member.

6. The brake actuating assembly of claim 1, wherein the second hydraulic circuit further includes a source of pressure fluid and an electrically actuable valve for selectively supplying pressure fluid from the source to selectively supply pressure fluid from the source to a second hydraulic piston of said hydraulic pistons forcing said second hydraulic piston to translate the cam member.

7. The brake actuating assembly of claim 1, wherein the resilient assembly comprises a Belleville piston for engaging the cam member and a Belleville spring mechanism for moving the Belleville piston toward the cam member.

8. The vehicle parking brake actuating assembly of claim 1, wherein the first and second hydraulic circuits each include a hydraulic piston that engages a corresponding end of the cam member and is responsive to applied hydraulic pressure to translate the cam member.

9. The vehicle parking brake actuating assembly of claim 8, wherein the first and second hydraulic circuits each further include a displacement piston resiliently biased to displace fluid away from the corresponding hydraulic piston subsequent to enablement of the corresponding hydraulic circuit.

10. A brake actuating assembly for a wheeled vehicle, comprising:
    a hydraulically actuable brake piston for moving friction braking surfaces into a braking mode of operation to arrest wheel rotation;
    an axially reciprocal cam member having a first cam surface and a second cam surface;
    a first hydraulic circuit for supplying hydraulic fluid to axially translate said cam member from a brake released position to a first position during said braking mode of operation;

a second hydraulic circuit for supplying hydraulic fluid to axially translate said cam member from said first position to said brake released position on termination of said braking mode of operation;

a resilient assembly for selectively engaging the second cam surface to obliquely move said cam member from a position of rest to an operational position in a first direction toward said brake piston during a parking brake mode of operation and temporally being compressed in an opposite second direction to allow said cam member to return to said brake released position; and wherein said cam member includes a positive release indent and a positive apply indent to receive a Belleville piston of said resilient assembly to prevent unintended parking actuation and parking release.

11. A vehicle parking brake actuating assembly comprising:

a first hydraulic circuit selectively enabled to initially apply a vehicle parking brake;

a resilient bias assembly for retaining a vehicle parking brake in the applied state; and a second hydraulic circuit selectively enabled to return the vehicle parking brake to an unapplied state; and, wherein said resilient bias assembly includes a brake piston for actuating the brake, a Belleville piston, a Belleville spring engaging the Belleville piston to move the Belleville piston toward the brake piston, a cam member disposed intermediate the Belleville piston and brake piston, and means including the first and second hydraulic circuits for reciprocal shuttling of the cam member between a brake applied position where the cam member transfers a biasing force from the Belleville spring into the brake piston, and a brake unapplied position where application of Belleville spring force to the brake piston is precluded by the cam member.

12. A method of applying and releasing a wheeled vehicle parking brake, comprising:

hydraulically forcing a vehicle service brake into a vehicle wheel rotation braking position;

applying a supplemental resilient bias to retain the vehicle service brake in the wheel rotation braking position while initially temporarily applying hydraulic pressure to overpower the resilient bias and subsequently relieving hydraulic pressure to allow the resilient bias to maintain the vehicle service brake in the wheel rotation braking position;

removing the hydraulic force while retaining the supplemental resilient bias thereby establishing and sustaining a parking brake position in the service brake;

re-establishing the hydraulic force to hydraulically move the vehicle service brake toward the vehicle wheel rotation braking position;

removing the supplemental resilient bias; and relieving the hydraulic force thereby establishing a parking brake released position in the service brake.

13. The method of applying and releasing a wheeled vehicle parking brake of claim 12 wherein the step of applying the supplemental resilient bias further includes subsequently relieving hydraulic pressure allows the resilient bias to maintain the wheel service brake in a released position.

* * * * *